Aug. 30, 1960
S. J. BECKER
2,950,796
THERMOSTATICALLY CONTROLLED CLUTCH
Filed Dec. 13, 1956
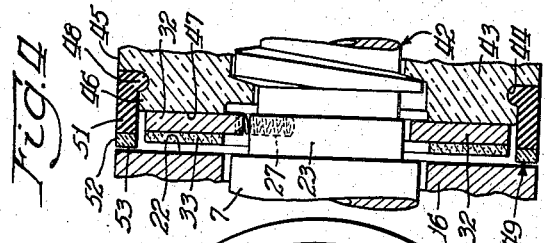
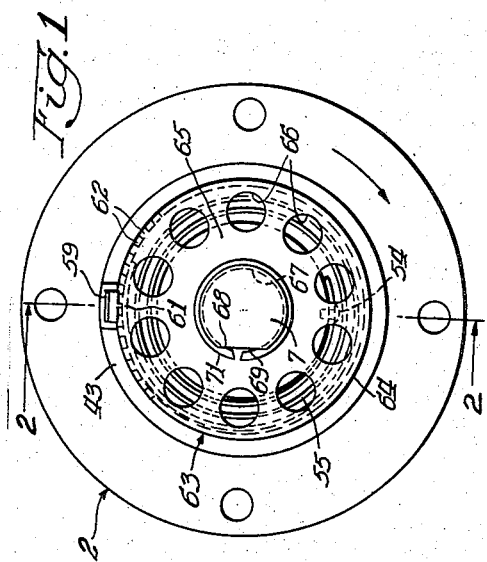
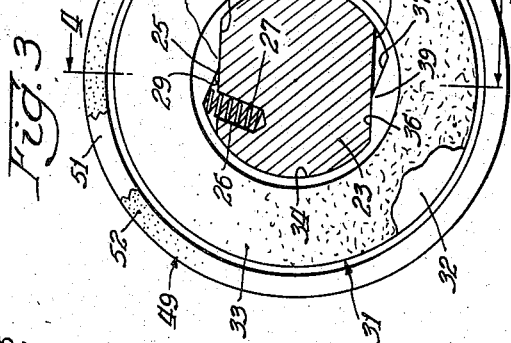
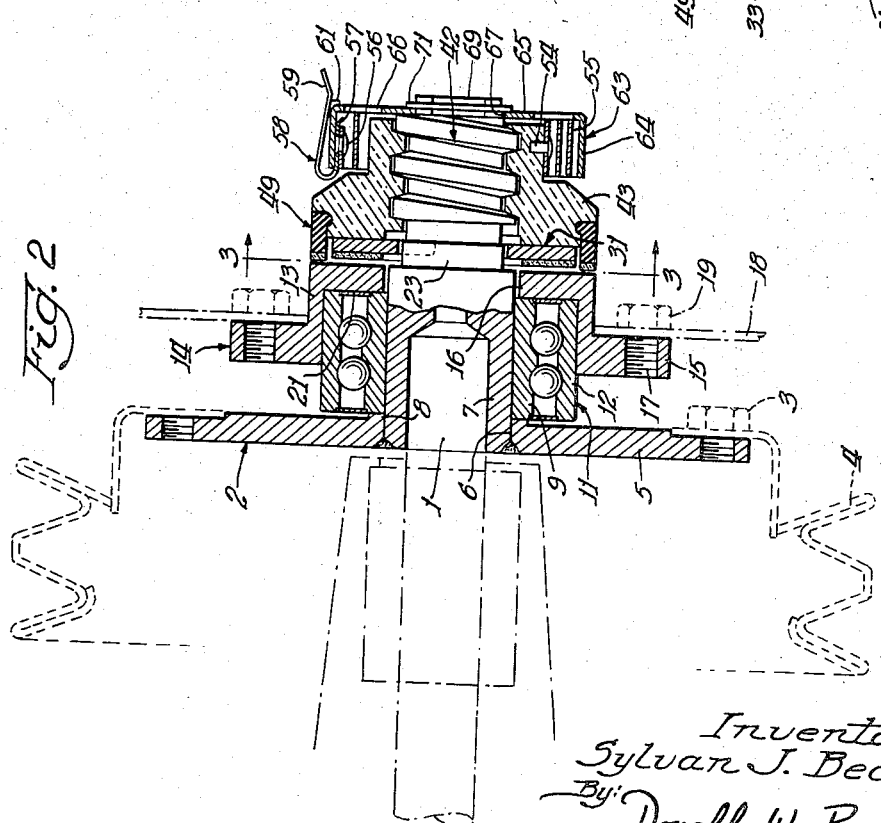
Inventor:
Sylvan J. Becker
By: Donald W. Banner
Atty.

United States Patent Office 2,950,796
Patented Aug. 30, 1960

1

2,950,796

THERMOSTATICALLY CONTROLLED CLUTCH

Sylvan J. Becker, Lombard, Ill., assignor to Borg-Warner Corporation, Chicago, Ill., a corporation of Illinois Filed Dec. 13, 1956, Ser. No. 628,108

18 Claims. (Cl. 192—82)

This invention relates to clutch devices, and more particularly to clutch devices responsive to ambient conditions particularly suited for controlling engagement between driving means and an automotive fan.

It is common practice to employ a cooling fan in conjunction with the internal combustion engine used as a source of power in modern automotive vehicles. It is, nevertheless, well recognized that such a fan when continuously driven wastes substantial power and fuel. A great many attempts have been made to provide a selectively operable device which will drive the fan when it should be driven, but which will disengage the fan from its driving means when it is not necessary to employ it. Despite the well recognized need for such a device, there is none such available which is sufficiently economical, reliable and sufficiently durable to gain common acceptance.

It is therefore one object of the present invention to provide a new and improved ambient condition responsive driving means which is more economical, durable and reliable than heretofore available.

Another object of the present invention is the provision of a device in accordance with the preceding object in which a driven member is connected to a driving member by a clutching device which provides for cushioned self-energization in response to predetermined ambient conditions and which further provides for rapid and effective self-disengagement under other conditions.

Another object is the provision of a device in accordance with the preceding objects in which a driving member is provided which has a clutch plate mounted thereon rotatable relative thereto to a predetermined degree only, in which biasing means are provided for effecting a normal predetermined relationship between the driving means and the clutch plate, additional thermally responsive clutch actuator means being provided to effect movement of said clutch plate into engaged position and movable by said clutch plate during the disengaging action thereof.

Another object is the provision, with devices according to the preceding objects, of improved means to adjust the thermal actuation point of the device.

Other objects and features of the invention will be readily apparent to those skilled in the art from the specification and appended drawings illustrating certain preferred embodiments in which:

Figure 1 is a front elevational view of a device constructed in accordance with the principles of the present invention;

Figure 2 is an enlarged sectional view along the plane of line 2—2 of Figure 1;

Figure 3 is an enlarged sectional view along the plane of line 3—3 of Figure 2;

Figure 4 is a sectional view along the plane of line 4—4 of Figure 3.

In the figures there is disclosed a device constructed in accordance with the principles of the present invention disposed in a typical automotive environment. There is illustrated a shaft 1 adapted to drive the water pump (not shown) of the vehicle, which is fixedly attached to a generally annular drive member 2, T-shaped in cross section, which is connected by bolts 3 to a pulley 4 conventionally driven by the fan belt of the vehicle. The member 2 comprises a generally annular plate 5 of steel or other suitable material having a central, circular opening 6 therein through which extends a drive part 7 having a circular outer periphery disposed within the opening 6, part 7 being also preferably made of steel and welded or otherwise fixedly joined to plate 5 and provided with a driving connection to the shaft 1. It will therefore be seen that all times during the period of rotation of the pulley 4 by the fan belt, the plate 5 and the drive part 7 will be continually rotated, and effect consequent continual rotation of the shaft 1 and the water pump connected thereto.

Plate 5 has a central, annular flange portion 8 against which is disposed the inner, annular race 9 of a double row radial thrust ball bearing 11, race 9 being seated on a complementary annular peripheral portion of the drive part 7. The bearing 11 is further provided with an outer annular race 12 upon which is seated a horizontally extending portion 13 of a fan carrier 14. Carrier 14 is generally annular in configuration, and generally Z-shaped in cross section, the horizontally extending portion 13 thereof joining axially spaced, radially extending portions 15 and 16. The outer portion 15 is provided with a plurality of circumferentially spaced, threaded openings 17; as illustrated in Figure 2, the carrier 14 is adapted for carrying an automotive fan 18 which has a central, circular opening therein seated upon the outer surface of portion 13 and having circumferentially spaced openings therein through which bolts 19 extend respectively, the inner threaded portions of bolts 19 being received in the threaded, complementary portions of the openings 17 so that the fan 18 is fixedly mounted to the carrier 14. Carrier 14 is prevented from rearward axial movement by the inner, annular surface 21 on the portion 16 of carrier 14, the surface 21 extending radially and being disposed in engagement with the race 12 of the bearing 11. Portion 16 is further provided with a forwardly facing, radially extending surface 22, parallel to the surface 21 which, as will be more fully described hereinafter, serves as an annular clutch surface. The carrier 14 is preferably formed of a material such as cast iron to ensure the effectiveness of this clutch surface.

The drive part 7, immediately forwardly (to the right in Figure 2) of the portion thereof surrounded by the carrier 14, is provided with a portion 23 of cross section best illustrated in Figure 3. As readily observable in that figure, portion 23 is formed to have flat surfaces 24 and 25, spaced by arcuate surfaces. Through surface 25 is drilled an opening 26, projecting at an acute angle of approximately 20° with respect to a perpendicular to the surface 25, opening 26 receiving a coiled compression spring 27. In the normal disengaged condition of the device illustrated in Figure 3, spring 27 extends outwardly of the opening 26 and into engagement with a flat surface 29 on a clutch plate, indicated in general by the numeral 31. This clutch plate 31 consists of a generally annular steel backing member 32 which carries on its rearwardly facing surface an annular facing 33 of friction material which is glued to the backing member 32 and which has some degree of compressibility or resiliency. A typical example of a suitable material is the brake lining sold by the Gatke Corporation under the designation style No. 2460. The central portion of the backing member 32 is provided with an opening of the configuration best illustrated in Figure 3 which has arcuate, spaced sides 34 and 35 in engagement with complementary portions of the portion 23. As illustrated in Figure 3, one end of the portion 34 is defined by the inwardly projecting flat surface 29; the opposite end of the arcuate portion 34 is defined by an inwardly projecting, flat surface 36. The opposite ends of arcuate portion 35 are respectively defined by inwardly extending flat surfaces 37 and 38 so that surfaces 36 and 37 meet along a common line 39, while surfaces 29 and 38 meet along a common line 41. Surfaces 29 and 38 are so constructed that when the clutch plate 31 is positioned such that these surfaces diverge radially outwardly equal amounts from a horizontally extending plane through line 41, each of these surfaces will define an angle of approximately 10 degrees with that horizontal plane; similarly surfaces 36 and 37 are constructed so that when clutch plate 31 is positioned such that these surfaces diverge radially outwardly equal amounts with respect to a horizontally extending plane through line 39, the surfaces 36 and 37 will each define an angle of approximately 10 degrees with that horizontal plane. As a result of this relationship, it will be seen that spring 27 in the normal disengaged condition of the device will bias the clutch plate 31 so that surfaces 38 and 36 will engage the flat surfaces 25 and 24 respectively on the portion 23 of the drive part 7 and that surfaces 29 and 37 will define an angle of approximately 20 degrees with these flat surfaces 25 and 24, respectively.

Immediately forwardly of the portion 23, the drive part 7 is provided with an externally threaded portion 42. This portion 42 is preferably provided with acme standard 29 degree stub threads, three threads per inch, the threads being left hand threads. Carried by this threaded portion 42 is a generally annular nut 43 having internal threads complementary to those provided on the threaded portion 42 of the drive part 7. Nut 43 preferably is formed of a phenolic resin moulded to have the acme left hand threads provided on an interior opening therein, and if desired a bronze powder may be incorporated in the phenolic resin material prior to molding which will act as a mild lubricant to lower the coefficient of friction of the phenolic resin. Nut 43 is also molded so as to have an annular recess 44 therein between portions 45 and 46 thereon of different diameters, as shown in Figure 4, portion 46 terminating in a radially extending surface 47 on the rearmost face of the nut 43. Disposed within the recess 44 is a flanged portion 48 of an annular buffer 49 which consists of a neoprene rubber body 51 which carries a nylon ring 52, molded to the rear face of the body 51. The buffer 49 is initially constructed such that the annular flange 48 on the body 51 is of substantially smaller diameter than that of the face of the body 51 to which the nylon ring 52 is attached; when the buffer 49, therefore, is snapped into the position illustrated in Figure 4, the diameter of the flanged portion 48 thereof is stretched outwardly so that the buffer 49 is under tension and will not, therefore, rotate relative to the nut 43. In this assembled position with the nut 43, it will be seen that the buffer 49 overlies the clutch plate 31, and that the nylon ring 52 has a radially extending, rearmost surface 53 spaced from the surface 22 on fan carrier 14, but closer to this surface 22 than the friction facing 33 on the clutch plate 31.

The forwardmost portion of the nut 43 is annular in configuration and of relatively reduced diameter and attached thereto by suitable means, such as a rivet 54, is one end of a spirally wound bimetal 55. The opposite end of bimetal 55 is connected by a suitable rivet 56 to the inner leg 57 of a generally U-shaped clip 58 which has an outer, longer leg 59. The clip 58 has an integral detent 61 projecting inwardly from the inner surface of leg 59 which is received between a pair of a plurality of serrations 62 formed on an outer surface of a generally cup shaped member 63 comprising an axially extending annular portion 64 and a forwardly facing, radially extending portion 65. As best illustrated in Figure 2, the clip 58 is carried by the portion 64 of the cup 63. As best illustrated in Figure 1, the radially extending portion 65 of the cup 63 is provided with a plurality of circumferentially spaced openings 66 through which heated air from the radiator—or other portions—of the vehicle in which the device of the present invention is disposed may pass to contact the bimetal 55. The cup 63 is provided also with a central opening 67 generally circular in configuration but provided with a flat side 68, this opening 67 being disposed in engagement with a complementary shaped portion 69 at the most forward part of the drive part 7 so that the cup 63 is prevented from rotating relative to the drive part 7. A bowed snap ring 71 is provided in a suitable slot in the part 69 of the drive part 7 to prevent vibration of cup 63 and forward axial movement of the cup 63 relative to the drive part 7, the inner wall of radially extending portion 65 of the cup 63 being disposed in engagement with a shoulder formed on the forward portion of the drive part 7 whereby rearward axial movement of the cup 63 is also prevented.

It should be understood that the device illustrated in the figures is mounted in the automotive vehicle so that the forward end of the drive part 7 (the right end from the view of Figure 2) is adjacent the rear surface of the vehicle radiator. Air passing through the radiator will, of course, be heated and, as previously explained, will pass through the openings 66 in the cup 63 so that the bimetal 55 may operate in response to this heated air. The bimetal 55 is so constructed and arranged that it biases the nut 43 toward the position illustrated in the figures when the bimetal temperature is sufficiently low. Under these conditions, as illustrated in the figures, when the fan belt drives the pulley 4, the drive part 7 and the shaft 1—and therefore the water pump—will be continuously rotated. The nut 43, the cup 63, bimetal 55, and the clutch plate 31 will, of course, rotate with the drive part 7. In a normal automotive installation, the direction of this rotation is clockwise when viewed from the front of the vehicle, as indicated by the arrow on Figure 1. Under these conditions, the fan carrier 14 will not be driven with the drive part 7, but will rotate in the same direction as that of drive part 7 but at a slower speed, this rotation resulting from the bearing drag and from the pitch of the fan blades connected to the carrier 14. It is important to notice that during this condition the carrier 14 is absorbing practically no power from the engine of the vehicle. During this disengaged condition of the device, the spring 27, as shown in Figure 3, maintains the clutch plate 31 in the particular relationship to portion 23 of drive part 7 which is indicated in Figure 3. In other words, spring 27 biases clutch plate 31 to a position in which the flat surface 38 and the flat surface 36 thereof are respectively in engagement with the flat surfaces 25 and 24 provided on the drive part portion 23. There is therefore, as previously described, approximately 20 degrees between the flat surfaces 29 and 37 and the surfaces 25 and 24 respectively.

When the temperature of the bimetal 55 is increased to a predetermined higher amount by heated air passing—for example—from the radiator into contact with the bimetal, the bimetal effects rotation of the nut 43 about the threaded portion 42 of the drive part 7. The direction of rotation of the nut 43 is counterclockwise with respect to drive part 7 when viewed from the front of the vehicle, the left hand threads on the drive part portion 49 and the nut 43 therefore effecting axial rearward movement of the nut 43. This movement progresses, it should be noted, without effecting any rotative movement of the clutch plate 31; the rear surface 47 on the nut 43 merely effects a sliding, axial movement of the clutch plate 31 in a rearwardly direction, the surfaces 38 and 36 on the clutch plate 31 remaining in engagement with the surfaces 25 and 24 of the drive part portion 23.

As nut 43 continues moving rearwardly with respect to the drive part 7, the face 53 on ring 52 of buffer 49 will eventually contact surface 22 on the carrier 14. It should be noted at this time that both the nut 43 and the carrier 14 will be rotating relative to the drive part 7 in the same direction, carrier 14 rotating in this relative direction faster than nut 43. As the nylon ring 52, therefore, contacts the carrier 14, the frictional engagement between these members will effect further rotation of the nut 43 in the same direction as was originally imparted to it by the bimetal 55. This will, of course, effect further rearward movement of the nut 43, the buffer 49 being compressed as this action takes place; such rearward movement of the nut 43 also effects axial movement of clutch plate 31 until the friction facing 33 thereon is also in engagement with the clutch surface 22 on the carrier 14. It should be noted that because of the relative direction of rotation of the parts, this engagement of the clutch plate 31 with the carrier 14 will not disturb the relationship between the clutch plate 31 and the drive part 7, which will remain as indicated in Figure 3. However, continued rearward axial movement of the nut 43, because of the engagement between the buffer ring 49 and the carrier 14, will force the friction facing 33 into tight engagement with the carrier 14, compressing the friction facing 33 slightly as this action takes place. With the clutch plate 31 in tight engagement with the carrier 14, it will be obvious that torque will be transmitted from the drive part 7, through the clutch plate 31 to the carrier 14, and the fan carried by the carrier 14 will be driven so as to rotate with the drive part 7. In this condition, with the parts "locked up," the unit operates to drive the fan connected to the carrier in substantially the same way as the standard automotive fan is driven, no further relative motion between any members of the unit occurring during this "locked up" condition.

The condition of the parts above described will obtain until the occurrence of two condition changes. These two condition changes are: (a) the temperature of the bimetal 55, and (b) the relative speeds of the drive part 7 and the fan carrier 14. Most specifically, it should be noted that the fan will remain in the "locked up" condition during periods in which the drive part 7 is driving the fan carrier 14 as previously described even though the bimetal 55 should become cool. The friction of the clutch surface 22 on the fan carrier 14 and the clutch plate 31, and between the carrier 14 and the nut 43, is such that the bimetal 55 does not have sufficient strength to move the nut 43 away from the carrier 14. Similarly, in the event that the bimetal 55 was still heated but the drive part 7 should momentarily rotate at a speed less than that of the carrier 14, as for example when the driver of the vehicle released his foot from the vehicle accelerator, there would be a momentary tendency for the nut 43 to move away from the carrier 14, but the heated bimetal 55 would substantially prevent such movement, or in any event immediately return the nut 43 to the "engaged" position with the fan carrier 14. On the other hand, however, if the bimetal 55 was at a substantially cooled temperature so that it was biasing the nut 43 in a rotary direction such that it tended to move away from the carrier 14, and during this condition the driver of the vehicle released his foot from the accelerator so that the rotative speed of the drive part 7 would substantially and suddenly decrease, it will be obvious that the carrier 14 will overrun the drive part 7, its inertia (and that of the fan which it carries) tending to maintain the carrier 14 rotating in the same direction and at the same speed. It will be readily apparent to those skilled in the art that when the driver of the vehicle permits the accelerator to move from a substantially depressed position to a substantially released position, the drive part 7 will have its rotative speed reduced markedly. The carrier 14 will therefore overrun the drive part 7; viewing the device from the front of the vehicle in which it is installed, this means that the fan carrier 14 will be rotating clockwise relative to the drive part 7. It should be recalled that at this instant the radial surface 53 on the ring 52 of the buffer 49, and the friction surface material 33 on the clutch plate 31, are in engagement with the radially extending surface 22 on the carrier 14. As a result of the friction between these members with the carrier 14, the nut 43 and the clutch plate 31 will be rotated in a clockwise direction, when viewed from the front of the vehicle, relative to the drive part 7. Attention is directed to Figure 3, and it should be noted that the view is in a direction forwardly of the vehicle, and from this position it would appear as though the clutch plate 31 is rotating counterclockwise with respect to the portion 23 of the drive part 7. It is obvious that the clutch plate 31 is rotated freely by the fan carrier 14 through the arcuate range of approximately 20 degrees between the surfaces 24, 25 and the flat surfaces 37 and 29, respectively, against the bias of the spring 27. In other words, the clutch plate 31 is rotated about the lines 39 and 41 to bring the surfaces 29 and 37 into engagement with the flat surfaces provided on portion 23 of the drive part 7 against the bias of the spring 27, this being effectively approximately 20 degrees of rotation. In view of the frictional engagement between the nylon ring 52 on the buffer 49 with the carrier 14 and the frictional engagement between the surface 47 on the nut 43 with the clutch plate 31, this rotation of the clutch plate 31 is imparted to the nut 43. Keeping in mind the fact that the bimetal 55 is assumed to be relatively cool, and consequently is biasing the nut 43 in the same direction of rotation as that imparted to it by this movement of the fan carrier 14 and the clutch plate 31, the nut 43 will be rotated in a clockwise direction relative to the drive part 7 (viewing this rotation from the front of the vehicle), so continued rotation of the nut 43 away from the carrier 14 is effected by the bimetal 55, until the bimetal occupies the position illustrated in Figure 4, in which the nylon ring 52 on the buffer 49 is spaced from the surface 22 on the carrier 14. Similarly, when the nut 43 is moved axially forwardly, it relieves the pressure on the clutch plate 31 which will result in movement of the clutch plate 31 away from the engaged position with the carrier 14. As soon as the frictional engagement between the carrier 14 and the clutch plate 31 is released, the spring 27 is immediately operable to rotate the clutch plate 31 approximately twenty degrees to the position illustrated in Figure 3 in which the flat surface 38 engages the flat surface 25 on the drive part 7, and the flat surface 36 on the clutch plate 31 engages the flat surface 24 of the drive part 7.

Attention is also directed to the means for changing the temperature at which the bimetal 55 will operate, these means being best illustrated in Figures 1 and 2. As illustrated therein, a clip 58 is provided which overlies a portion of the annular, axially extending flange 64 on the cup 63. The inner leg of the clip 58 is fixedly attached to one end of the bimetal 55, while the opposite leg of the clip 58 has a detent adapted to engage serrations provided around the outer surface of the cup 63. It will be readily apparent to those skilled in the art that the temperature at which the fan carrier 14 may be "locked up" may be readily varied by changing the position of the clip 58 relative to the cup 63, the detent 61 on the arm 59 of the clip 58 being readily positionable between the serrations provided on the cup and held there by those serrations after any adjustment thereof. The temperature at which the fan will therefore be driven by the drive part 7 may be varied through a wide range by a simple and effective mechanism which changes the tension on the bimetal 55 as desired.

It should be noted that the present invention provides a clutching mechanism particularly well adapted to connect a rotating part which serves as the driver to a driven part in such a manner that there is no shock or impact imparted to the mechanism when the engagement between the driving and driven parts is effected. It is also important to notice that the device is self-energizing toward its locked up position once it is engaged, but that its disengagement is automatically effected when the driven member overruns the driving member, assuming the condition responsive element to be properly actuated. With regard to this disengaging action, attention is directed to the fact that the lost motion connection between the driving member and the driven member is provided through a clutch member which has a lost motion connection to the driving member, this clutch plate rotating freely relative to the driving member through a predetermined arc and imparting this movement to the nut which normally locks the clutch plate to the driven member, to automatically move the nut away from the driven member. When the nut is moved to the opposite direction, it is particularly important to notice that the spring maintains the clutch plate and the driving member in a particular relative relationship so that no false tightening of the nut occurs as the clutch plate and the carrier are engaged which results in a condition between the parts which aids the aforementioned self disengagement. Another important feature of this invention resides in the fact that the nut 43 may be responsive to ambient conditions, such as temperature, so that the fan is controlled in its engagement by the temperature of the ambient condition responsive element. It is also further important to note that the temperature or other conditions at which this ambient condition responsive element operates may be varied by means which are both simple and reliable. However, should the bimetal employed break, the unit will "lock up" due to the normal rotation thereof and the fan will be continuously driven. Furthermore, the device may be installed on standard pump shafts of modern automotive vehicles, with no modifications of such standard shafts or other vehicle portions being required. It is particularly important to notice that all of the foregoing features provided by the present invention are accomplished by means which are relatively inexpensive, which are rugged and reliable, which have long life and which are readily produced by mass production methods.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

I claim:
1. In a clutch device particularly adapted to effect desired engagement between a driving member and a vehicle fan comprising a driving part adapted to be rotated, a driven member normally rotatable relative to said driving member, clutch means mounted on said driving member for axial movement relative thereto, means providing a limited rotational lost motion connection normally effective in one rotational direction only between said clutch means and driving member whereby said clutch means are freely rotatable relative to said driving member through a predetermined arcuate range only, axially movable means adapted to effect engagement of said clutch means with said driven member to provide a driving connection between said driving and driven members through said clutch means, and ambient condition responsive means to hold said axially movable means spaced from said driven member under certain ambient conditions and to effect movement of said axially movable means toward said driven member to effect said clutch engagement under other ambient conditions.

2. In a clutch device particularly adapted to effect desired engagement between a driving member and a vehicle fan comprising a driving part adapted to be rotated, a driven member normally rotatable relative to said driving member, clutch means mounted on said driving member for axial movement relative thereto, means providing a limited rotational lost motion connection normally effective in one rotational direction only between said clutch means and driving member whereby said clutch means are freely rotatable relative to said driving member through a predetermined arcuate range only, axially movable means mounted on said driving member for both axial and rotational movement relative thereto adapted to effect engagement of said clutch means with said driven member to provide a driving connection between said driving and driven members through said clutch means, and ambient condition responsive means to hold said axially movable means spaced from said driven member under certain ambient conditions and to effect movement of said axially movable means toward said driven member to effect said clutch engagement under other ambient conditions.

3. In a clutch device particularly adapted to effect desired engagement between a driving member and a vehicle fan comprising a driving part adapted to be rotated, a driven member normally rotatable relative to said driving member, clutch means mounted on said driving member for axial movement relative thereto, means providing a limited rotational lost motion connection normally effective in one rotational direction only between said clutch means and driving member whereby said clutch means are freely rotatable relative to said driving member through a predetermined arcuate range only, means biasing said clutch means toward a predetermined rotated position relative to said driving member, axially movable means adapted to effect engagement of said clutch means with said driven member to provide a driving connection between said driving and driven members through said clutch means, and ambient condition responsive means to hold said axially movable means spaced from said driven member under certain ambient conditions and to effect movement of said axially movable means toward said driven member to effect said clutch engagement under other ambient conditions.

4. In a clutch device particularly adapted to effect desired engagement between a driving member and a vehicle fan comprising a driving part adapted to be rotated, a driven member normally rotatable relative to said driving member, clutch means mounted on said driving member for axial movement relative thereto, means providing a limited rotational lost motion connection normally effective in one rotational direction only between said clutch means and driving member including biasing means between said clutch means and driving member whereby said clutch means are freely rotatable relative to said driving member through a predetermined arcuate range only, axially movable means mounted on said driving member for both axial and rotational movement relative thereto adapted to effect engagement of said clutch means with said driven member to provide a driving connection between said driving and driven members through said clutch means, and ambient condition responsive means to hold said axially movable means spaced from said driven member under certain ambient conditions and to effect movement of said axially movable means toward said driven member to effect said clutch engagement under other ambient conditions.

5. In a clutch device particularly adapted to effect desired engagement between a driving member and a vehicle fan comprising a driving part adapted to be rotated, a driven member normally rotatable relative to said driving member, clutch means mounted on said driving member for axial movement relative thereto, means providing a limited rotational lost motion connection normally effective in one rotational direction only between said clutch means and driving member whereby said clutch means are freely rotatable relative to said driving member through a predetermined arcuate range only, means on said driving member defining a threaded portion thereon, a nut threadably mounted on said threaded portion for rotational and axial movement relative thereto adapted to effect engagement of said clutch means with said driven member to provide a driving connection between said driving and driven members through said clutch means, and bimetallic means adapted to hold said nut in a position spaced from said driven means under certain ambient conditions and to effect rotation of said nut relative to said threaded portion and consequent axial movement of said nut toward said driven member under other ambient conditions to effect said clutch engagement.

6. In a clutch device particularly adapted to effect desired engagement between a driving member and a vehicle fan comprising a driving part adapted to be rotated, a driven member normally rotatable relative to said driving member, clutch means mounted on said driving member for axial movement relative thereto, means providing a limited rotational lost motion connection normally effective in one rotational direction only between said clutch means and driving member whereby said clutch means are freely rotatable relative to said driving member through a predetermined arcuate range only including means biasing said clutch means toward a predetermined rotated position relative to said driving member, means on said driving member defining a threaded portion thereon, a nut threadably mounted on said threaded portion for rotational and axial movement relative thereto adapted to effect engagement of said clutch means with said driven member to provide a driving connection between said driving and driven members through said clutch means, and bimetallic means adapted to hold said nut in a position spaced from said driven means under certain ambient conditions and to effect rotation of said nut relative to said threaded portion and consequent axial movement of said nut toward said driven member under other ambient conditions to effect said clutch engagement.

7. In a clutch device particularly adapted to effect desired engagement between a driving member and a vehicle fan comprising a driving part adapted to be rotated, a driven member normally rotatable relative to said driving member, clutch means mounted on said driving member for axial movement relative thereto, means providing a limited rotational lost motion connection normally effective in one rotational direction only between said clutch means and driving member whereby said clutch means are freely rotatable relative to said driving member through a predetermined arcuate range only, means on said driving member defining a threaded portion thereon, a nut threadably mounted on said threaded portion for rotational and axial movement relative thereto adapted to effect engagement of said clutch means with said driven member to provide a driving connection between said driving and driven members through said clutch means, and bimetallic means mounted upon said driving member and connected to said nut to hold said nut in a position spaced from said driven means under certain ambient conditions and to effect rotative movement thereof under other predetermined temperature conditions whereby said nut is moved axially toward said driven member to effect said clutch engagement.

8. In a clutch device particularly adapted to effect desired engagement between a driving member and a vehicle fan comprising a driving part adapted to be rotated, a driven member normally rotatable relative to said driving member, clutch means mounted on said driving member for axial movement relative thereto, means providing a limited rotational lost motion connection normally effective in one rotational direction only between said clutch means and driving member whereby said clutch means are freely rotatable relative to said driving member through a predetermined arcuate range only including means biasing said clutch means toward a predetermined rotated position relative to said driving member, means on said driving member defining a said threaded portion for rotational and axial movement relative thereto adapted to effect engagement of said clutch means with said driven member to provide a driving connection between said driving and driven members through said clutch means, and bimetallic means mounted upon said driving member and connected to said nut to hold said nut in a position spaced from said driven means under certain ambient conditions and to effect rotative movement thereof under other predetermined temperature conditions whereby said nut is moved axially toward said driven member to effect said clutch engagement.

9. In a clutch device particularly adapted to effect desired engagement between a driving member and a vehicle fan comprising a driving part adapted to be rotated, a driven member normally rotatable relative to said driving member, clutch means mounted on said driving member for axial movement relative thereto, means providing a limited rotational lost motion connection between said clutch means and driving member whereby said clutch means are freely rotatable relative to said driving member through a predetermined arcuate range only, means on said driving member defining a threaded portion thereon, a nut threadably mounted on said threaded portion for rotational and axial movement relative thereto, resilient buffer means carried by said nut adjacent said driven member adapted to be engaged therewith upon axial movement of said nut toward said driven member whereby said nut may be moved closer to said driven member by the frictional engagement between said driven member and said buffer means and effect axial movement of said clutch means into engagement with said driven member to provide a driving connection between said driving and driven members through said clutch means, and a coiled bimetallic member mounted upon said driving member connected to said nut to effect rotative movement thereof under predetermined temperature conditions whereby said nut is moved axially.

10. In a vehicle fan clutch device, driving means adapted to be rotated, screw thread means on said driving means, generally annular driven means adapted to carry a vehicle fan carried by said driving means and normally rotational relative thereto, annular clutch means carried by said driving means between said driven means and said screw thread means, means providing a limited rotational lost motion connection between said clutch means and said driving means whereby said clutch means are rotatable relative to said driving means through a predetermined arcuate range only, a nut adjacent said clutch means threadably mounted on said screw thread means for rotational and axial movement relative thereto, said screw thread means being constructed with a thread direction characterized to cause rotation of said nut relative thereto as it is moved toward said driven means which is in the same direction as the rotation of said driven means relative to said drive means when said nut is spaced from said driven means and the vehicle is moving forwardly, resilient buffer means carried by said nut disposed radially outwardly of said clutch means and extending toward said driven means, and thermally responsive means carried by said driving means adapted to effect rotation of said nut relative to said driving means whereby at predetermined thermal conditions said nut is moved toward said driven means and said buffer is frictionally engaged with said driven means which effects further movement of said nut toward said driven means and axial movement of said clutch means into engagement with said driven means to effect the driving thereof.

11. In a vehicle fan clutch device, driving means including means defining a central opening therein adapted to receive the end portion of pump shaft, screw thread means on said driving means, generally annular driven means adapted to carry a vehicle fan carried by said driving means and normally rotatable relative thereto, annular clutch means carried by said driving means between said driven means and said screw thread means, means providing a limited rotational lost motion connection between said clutch means and said driving means whereby said clutch means are rotatable relative to said driving means through a predetermined arcuate range only, a nut adjacent said clutch means threadably mounted on said screw thread means for rotational and axial movement relative thereto, said screw thread means being constructed with a thread direction characterized to cause rotation of said nut relative thereto as it is moved toward said driven means which is in the same direction as the rotation of said driven means relative to said drive means when said nut is spaced from said driven means and the vehicle is moving forwardly, resilient buffer means carried by said nut disposed radially outwardly of said clutch means and extending toward said driven means, and thermally responsive means carried by said driving means adapted to effect rotation of said nut relative to said driving means whereby at predetermined thermal conditions said nut is moved toward said driven means and said buffer is frictionally engaged with said driven means which effects further movement of said nut toward said driven means and axial movement of said clutch means into engagement with said driven means to effect the driving thereof.

12. In a vehicle fan clutch device, driving means comprising an annular member adapted for attachment to a pulley and means defining a central opening adapted to receive the end portion of a pump shaft, screw thread means on said driving means, generally annular driven means adapted to carry a vehicle fan carried by said driving means and normally rotatable relative thereto, annular clutch means carried by said driving means between said driven means and said screw thread means, means providing axial movement of said clutch means relative to said driving means, means providing a limited rotational lost motion connection between said clutch means and said driving means whereby said clutch means are rotatable relative to said driving means through a predetermined arcuate range only, a nut adjacent said clutch means threadably mounted on said screw thread means for rotational and axial movement relative thereto, said screw thread means being constructed with a thread direction characterized to cause rotation of said nut relative thereto as it is moved toward said driven means which is in the same direction as the rotation of said driven means relative to said drive means when said nut is spaced from said driven means and the vehicle is moving forwardly, resilient buffer means carried by said nut disposed radially outwardly of said clutch means and extending toward said driven means, and thermally responsive means carried by said driving means adapted to effect rotation of said nut relative to said driving means whereby at predetermined thermal conditions said nut is moved toward said driven means and said buffer is frictionally engaged with said driven means which effects further movement of said nut toward said driven means and axial movement of said clutch means into engagement with said driven means to effect the driving thereof.

13. In a vehicle fan clutch device, driving means comprising an annular member adapted for attachment to a pulley and means defining a central opening adapted to receive the end portion of a pump shaft, screw thread means on said driving means, generally annular driven means adapted to carry a vehicle fan rotatably carried by said driving means, annular clutch means carried by said driving means between said driven means and said screw thread means, means providing axial movement of said clutch means relative to said driving means, means providing a limited rotational lost motion connection between said clutch means and said driving means whereby said clutch means are rotatable relative to said driving means through a predetermined arcuate range only, a nut adjacent said clutch means threadably mounted on said screw thread means for rotational and axial movement relative thereto, resilient buffer means carried by said nut disposed radially outwardly of said clutch means and extending toward said driven means, a coiled bimetallic element, means connecting said element to said nut, a generally cup shaped member fixedly carried by said driving means, and means connecting said element to said cup shaped member, said element being adapted to effect movement of said nut relative to said driving means.

14. The device defined in claim 13 in which said means connecting said element and cup shaped member comprises a generally U-shaped clip engageable with said cup shaped member at various places to vary the tension of said element.

15. In a clutch device, driving means adapted for rotation, annular driven means carried by said driving means normally rotatable relative thereto, annular clutch means carried by said driving means and movable relative thereto disposed adjacent said driven means, rotational lost motion means between said clutch means and said driving means normally effective in one rotational direction only whereby said clutch means are rotatable relative to said driving means through a predetermined arcuate range only, axially movable means adapted to effect engagement between said driven means and said clutch means, and means to effect movement of said axially movable means.

16. The device defined in claim 15, in which said rotational lost motion means comprise flat surface means on said driving means and generally V-shaped projections in engagement therewith integral with said clutch means.

17. In a clutch device, driving means adapted for rotation, annular driven means carried by said driving means normally rotatable relative thereto, annular clutch means carried by said driving means and movable relative thereto disposed adjacent said driven means, rotational lost motion means between said clutch means and said driving means normally effective in one rotational direction only whereby said clutch means are rotatable relative to said driving means through a predetermined arcuate range only including means biasing said clutch means toward a predetermined rotated position relative to said driving means, axially movable means adapted to effect engagement between said driven means and said clutch means, and means to effect movement of said axially movable means.

18. The device defined in claim 17, in which said rotational lost motion means comprise flat surface means on said driving means and generally V-shaped projections in engagement therewith integral with said clutch means.

References Cited in the file of this patent

UNITED STATES PATENTS

| | | |
|---|---|---|
| 750,944 | Bryan | Feb. 2, 1904 |
| 934,597 | Ellett | Sept. 21, 1909 |
| 936,190 | Tuckfield | Oct. 5, 1909 |
| 1,157,408 | Master | Oct. 19, 1915 |
| 1,292,991 | Barstow | Feb. 4, 1919 |
| 1,460,234 | Eilers | June 26, 1923 |
| 1,770,419 | McGrath | July 15, 1930 |
| 1,935,459 | Ryan et al. | Nov. 14, 1933 |
| 2,005,468 | Modine | June 18, 1935 |
| 2,214,391 | Weydell | Sept. 10, 1940 |
| 2,381,567 | Bonham | Aug. 7, 1945 |
| 2,593,521 | Ball | Apr. 22, 1952 |
| 2,603,420 | Tacchi | July 15, 1952 |
| 2,781,882 | Burkhardt | Feb. 19, 1957 |

FOREIGN PATENTS

| | | |
|---|---|---|
| 64,058 | Switzerland | Jan. 21, 1913 |
| 406,934 | Germany | Dec. 4, 1924 |

UNITED STATES PATENT OFFICE

CERTIFICATE OF CORRECTION

Patent No. 2,950,796            August 30, 1960

Sylvan J. Becker

It is hereby certified that error appears in the printed specification of the above numbered patent requiring correction and that the said Letters Patent should read as corrected below.

Column 9, line 74, after "driving" insert -- member, means on said driving member defining a --; column 10, line 1, strike out "member, means on said driving member defining a".

Signed and sealed this 4th day of April 1961.

(SEAL)
Attest: ERNEST W. SWIDER

XXXXXXXXX
Attesting Officer

ARTHUR W. CROCKER
Acting Commissioner of Patents